United States Patent [19]

Hall

[11] 4,212,353

[45] Jul. 15, 1980

[54] HYDRAULIC MINING TECHNIQUE FOR RECOVERING BITUMEN FROM TAR SAND DEPOSIT

[75] Inventor: Wilbur L. Hall, Bellaire, Tex.

[73] Assignee: Texaco Inc., White Plains, N.Y.

[21] Appl. No.: 920,933

[22] Filed: Jun. 30, 1978

[51] Int. Cl.$^2$ .................... E21B 43/24; E21B 43/37; E21C 37/06

[52] U.S. Cl. .................... 166/303; 166/267; 166/307; 299/7; 299/17

[58] Field of Search .................... 166/267, 303, 307; 299/17, 5

[56] References Cited

U.S. PATENT DOCUMENTS

| | | | |
|---|---|---|---|
| 3,050,289 | 8/1962 | Gerner | 299/17 X |
| 3,057,404 | 10/1962 | Bergstrom | 166/267 |
| 3,221,813 | 12/1965 | Closmann et al. | 166/272 X |
| 3,483,923 | 12/1969 | Darley | 166/272 X |
| 3,515,214 | 6/1970 | Finch | 166/272 |
| 3,581,823 | 6/1971 | Feuerbacher | 166/267 |
| 3,858,654 | 1/1975 | Walker | 166/303 X |
| 3,951,457 | 4/1976 | Redford | 299/17 X |
| 3,957,308 | 5/1976 | Lambly et al. | 299/17 X |

Primary Examiner—Stephen J. Novosad
Assistant Examiner—George A. Suchfield
Attorney, Agent, or Firm—Carl G. Ries; Thomas H. Whaley; J. H. Park

[57] ABSTRACT

Viscous petroleum including bitumen may be recovered from unconsolidated sand formations such as tar sand deposits by hydraulic mining. Hot water of steam and an amine are introduced into the subterranean deposit with sufficient velocity to dislodge bitumen and particles of sand therefrom. The process is a single wellbore operation using rotatable vertically moveable injection string with one or more jets near the bottom thereof, with separate return flow path to surface, the inlet to which may be on the bottom of the injection string. The injection string may be raised or lowered while rotating and jetting so the full vertical thickness of tar sand interval is contacted by aqueous mining fluid. Jet pump may be used to pump petroleum to surface. The aqueous hydraulic mining fluid comprises hot water or steam and an amine having the following formula:

$$R_1R_2NR_3$$

wherein $R_1$ and $R_2$ are each hydrogen or a $C_1$ to $C_6$ and preferably a $C_2$ to $C_4$ alkyl, linear or branched, and $R_3$ is an alkyl, linear or branched, having from 3 to 20 and preferably 4 to 12, or $R_3$ is —$R_4NH_2$ wherein $R_4$ is a $C_2$ to $C_{18}$ alkyl, linear or branched, and preferably 3 to 11, the sum of carbon atoms in $R_1$, $R_2$ and $R_3$ being from 3 to 20 and preferably from 7 to 13.

15 Claims, 1 Drawing Figure

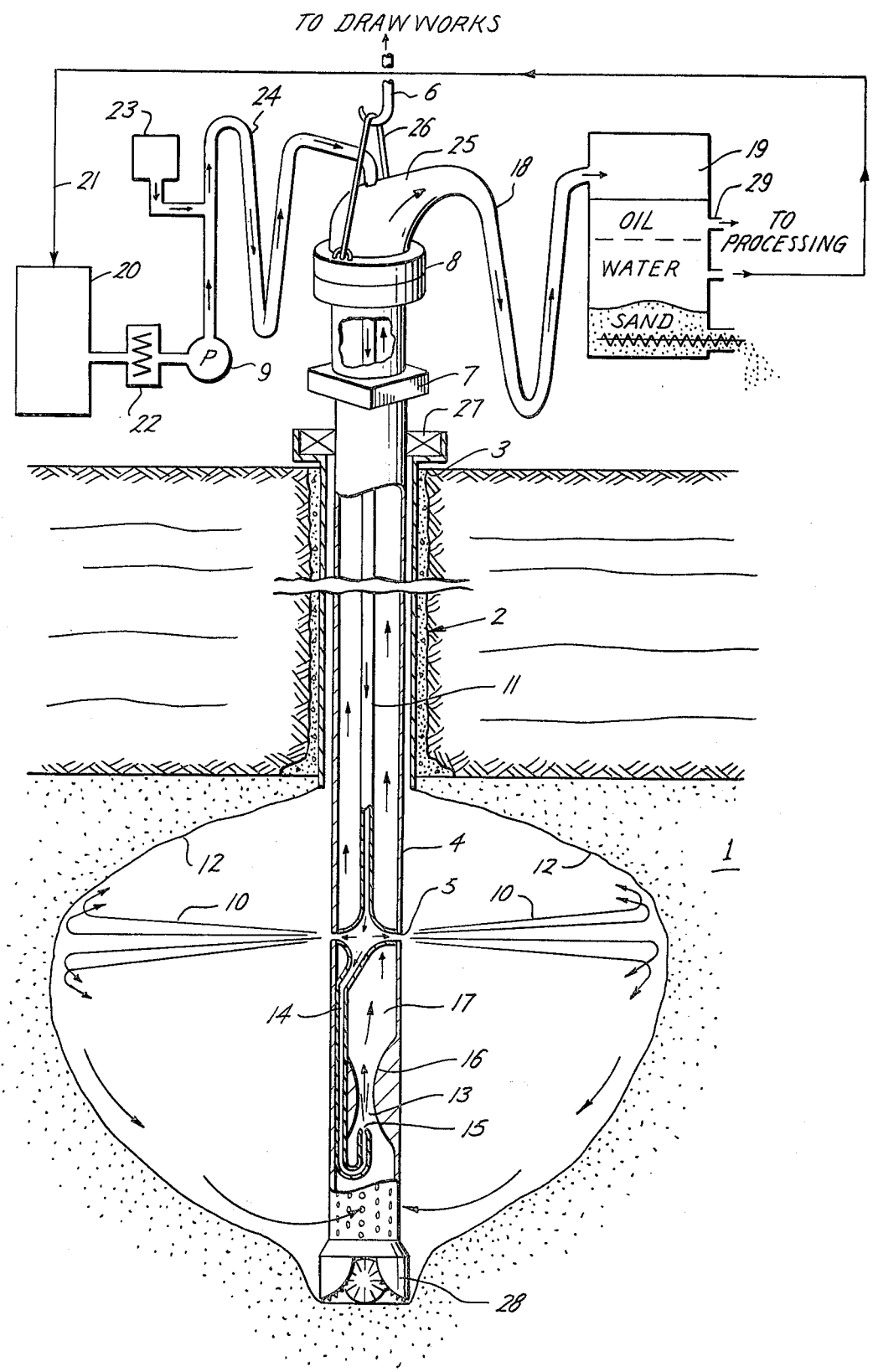

HYDRAULIC MINING TECHNIQUE FOR RECOVERING BITUMEN FROM TAR SAND DEPOSIT

CROSS REFERENCE TO RELATED APPLICATION

This application is related to copending application Ser. No. 918,872 filed June 26, 1978, now U.S. Pat. No. 4,156,463 for "Viscous Oil Recovery Method", and to application Ser. No. 920,761 filed June 30, 1978, for "Process for Separating Bitumen from Tar Sand Recovered from Deposits by Mining".

FIELD OF THE INVENTION

This invention pertains to a method for recovering petroleum from subterranean formations including tar sand deposits by hydraulic mining, especially applicable to tar sand deposits intermediate depth deposits not amenable to strip mining or to in situ separation requiring high pressure fluid injection.

BACKGROUND OF THE INVENTION

Petroleum is found in subterranean formations or reservoirs in which it has accumulated, and recovery of conventional petroleum is achieved by penetrating these reservoirs with wells and permitting the fluid to flow to the surface as a result of natural pressure existing in the reservoir, or by pumping the fluid to the surface as a result of natural pressure existing in the reservoir, or by pumping the fluid to the surface in instances where insufficient natural pressure exists to force it to flow to the surface. There are many reservoirs which contain petroleum too viscous to be pumped from the formation under normal circumstances. When such formations are encountered, production is possible only by means of some process of supplemental recovery, commonly referred to as secondary or tertiary recovery, in which energy is supplied to the formation to force the petroleum to move, and heat and/or a solvent is supplied to the formation to reduce the viscosity of the petroleum so it will flow.

The most extreme examples of formations which contain petroleum too viscous to be recovered by conventional means are the so-called tar sands or bitumen sands, such as those located in the Western United States, Western Canada, and Venezuela. These formations are known to contain huge reserves of bituminous petroleum, but the bituminous petroleum contained therein is too viscous to be recoverable by conventional techniques.

The present state of the art for the recovery of bitumen from tar sand deposits can be generally classified as strip mining or in situ separation. Strip mining requires removal of the overburden by mechanical means and the mixture of bitumen and sand that constitutes the tar sand deposit is then similarly removed by mechanical means and transported to a surface processing plant for separation of bitumen and sand. In situ separation processes make use of techniques for separating the bitumen from the said within the tar sand deposit itself, so the bitumen in some modified form may be transported to the surface with at least a major portion of the sand left in the tar sand deposit. Techniques proposed in the prior art for in situ separation may be classified as thermal or emulsification processes. The thermal techniques include in situ combustion, (fire flooding), and steam flooding. Emulsification processes may also involve the use of steam in addition to an additional chemical to promote emulsification of the high viscosity bitumen so that it may be transported to the surface where the emulsion is resolved into bitumen and water. Although many in situ separation techniques have been proposed in the prior art, none have been both economically and technically successful.

Most known in situ processes involve injection of fluid under fairly high pressures. Injection of high pressure fluid can be conducted safely only is the formation overburden thickness is sufficiently great to contain the high pressure fluids injected thereinto without rupturing. Strip mining of a tar sand deposit is economically feasible only if the ratio of overburden thickness to tar sand deposit thickness is around one or less. Even when the tar sand deposit is fairly shallow, strip mining is still very expensive; the cost of removing overburden and tar sand material represents from 50–60 percent of the total cost of producing a pipeline-acceptable product. Many deposits have overburden which is too thick to permit exploitation by strip mining, and not great enough to contain high pressure fluids for in situ separation processes.

In view of the foregoing, it can be appreciated that there is a substantial, unfulfilled need for a method for recovery of bituminous material from tar sand deposits, particularly those intermediate depth deposits which are not suitable for strip mining or for in situ recovery processes involving injection of a high pressure fluid.

PRIOR ART

U.S. Pat. No. 3,951,457 and 3,858,654 describe hydraulic mining processes for recovering heavy oil from oil sand deposits.

BRIEF DESCRIPTION OF THE DRAWING

The attached drawing illustrates in cross-sectional view both the surface and subsurface equipment and well completion for application of one illustrative embodiment of my process for hydraulic-mining of tar sand deposits.

SUMMARY OF THE INVENTION

I have discovered, and this constitutes my invention, that heavy or viscous oil including bitumen may be recovered from subterranean heavy oil deposits in which the mineral particles are unconsolidated, including tar sand deposits, by a hydraulic mining techniques wherein the tar sand is contacted by a fluid comprising hot water or steam and an amine having the following formula

wherein $R_1$ and $R_2$ are each hydrogen or a $C_1$ to $C_6$ and preferably a $C_2$ to $C_4$ alkyl, linear or branched, $R_3$ is a $C_3$ to $C_{20}$ and preferably $C_4$ to $C_{12}$ alkyl, linear or branched, or —$R_4NH_2$ wherein $R_4$ is 2 to 18 and preferably 3 to 11 alkyl, linear or branched, and the sum of the number of carbon atoms in $R_1$, $R_2$ and $R_3$ is from 3 to 20 and preferably 7 to 13. In one embodiment, and injection string capable of both rotation and axial (vertical) movement, equipped near its lower end with jet nozzles which direct the aqueous hydraulic mining fluid as one or more jet streams against the tar sand deposit face, is employed. A separate communication path to the surface of the earth facilitates movement of the injected hydraulic mining fluid with bitumen dispersed therein to the surface for further processing. The injection string is constructed so as to permit its simultaneous rotation and vertical movement as the aqueous hydraulic mining fluid is injected down the injection string and out through the jet nozzles, so that a stream of fluid sweeps the tar sand deposits.

DESCRIPTION OF THE PREFERRED EMBODIMENTS

My invention can best be understood by referring to the attached drawing, in which a tar sand deposit 1 is located at a depth which is too great for economical strip mining and not deep enough to permit using an in situ recovery technique requiring injection of a high pressure fluid. A combination injection-production well 2 is drilled to the bottom of the tar sand deposit, and casing 3 is set to the top of the formation. A separate injection string 4 is run inside the casing 3, to the top of the tar sand deposit. The injection string 4 is equipped with nozzles 5 near the bottom thereof, and the completion equipment on the surface includes means such as kelly drive bushing 7 for rotating the injection string and lifting hook 6 for raising and lowering the string as fluid is pumped down the string. A swivel 8 provides an essentially leak proof seal between the nonrotating upper portion and rotating lower portion of injection string 4. Pump 9 pumps the aqueous hydraulic mining fluid down the injection string 4 with sufficient pressure to form high velocity jets 10 and insure that jets 10 contacts the tar sand with considerable impact velocity to dislodge bitumen and sand.

The rotatable, vertically moveable injection string 4 contains an interior flow path 11 for pumping the aqueous hydraulic mining fluid down the string where a portion of it passes out through jets 5 to form jet streams 10, which impinge against the walls 12 of the cavity which has been formed in tar sand deposit 1. Some means for pumping the dislodged bitumen from the lower portion of the cavity must be provided. In this embodiment, the pumping function is accomplished by a jet pump 13. The fluid for operating the jet pump is the aqueous hydraulic mining fluid in this embodiment, although a separate hydraulic fluid may be used. A portion of the aqueous hydraulic mining fluid passes to the jet pump 13 via flow line 14 where it exits through nozzle 15, and then through venturi 16. The passage of fluid through the venturi creates a zone of reduced pressure in the venturi, which draws bitumen and other material from the bottom of the cavity and forces it upward toward the surface via return flow path 17. The fluid including bitumen passes out through flexible fluid discharge line 18 into settling tank 19. More than one tank in series may be utilized, although only one is shown for simplicity. The fluid separates into oil or bitumen and water, with the sand separating to the bottom of settling tank. The water is recycled through holding tank 20 via line 21. The water is heated in heat exchanger 22 and pumped via fluid inlet line 24 into the top of injection flow path 11, where it passes back to jets 5 as described above.

A noncondensible gas such as nitrogen, air, methane, carbon dioxide, etc. or a mixture of one or more of the gases is used in the embodiment shown in the drawing. The gas is supplied from compressor or vessel 23, to mix with the aqueous hydraulic fluid and pass via flexible input line 24 to injection flow path 11. The use of gas in this process is very desirable since it aids in supporting the overburden, improves pumping effectiveness, and by maintaining the cavity gas filled, allows the jets of hydraulic mining fluid to penetrate deeper into the formation.

The top of the injection string contains a high pressure swivel assembly 25 into which fluid injection and discharge lines connect. A bail 26 is also provided for engaging lifting hook 6 connected to the drawworker (not shown). This arrangement allows the entire assembly to be lowered into the well and moved up and down as needed to allow the jet streams 10 to sweep the entire vertical thickness of the formation. The hydraulic mining strip is rotated by a convenient means such as a drilling rig kelly (not shown) engaging the kelly drive bushing 7.

The surface completion should also include a sealing element 27 so that no blow-by occurs between the hydraulic mining injection string assembly 4 and casing 3. This allows maintenance of positive fluid pressure within cavity 12, for purposes to be described below.

On the very bottom of the assembly of this illustrative embodiment is a conventional drill bit 28 which permits drilling the well through the tar sand interval with the same equipment as is used for the hydraulic mining operation. The drill bit is also useful for breaking up clumps of tar sand material which are dislodged and accumulate in the bottom of the cavity in the tar sand deposit.

The overall equipment as embodied in the attached drawing is known in the art of hydraulic mining. For example, an article titled "Subsurface Hydraulic Mining Through Small Diameter Boreholes": pages 24–27, *Mining and Minerals Engineering*, November, 1969 describes an essentially identical apparatus used in drilled consolidated formations such as limestone with an abrasive laden fluid pumped by an explosion type pumping system.

The particularly rotating injection string shown in the drawing is not an essential feature of the invention, although it is the preferred method for obtaining the desired jetting action. A non-rotating string with a plurality of horizontally displayed nozzles could also be used.

In operation, the aqueous hydraulic mining fluid is pumped from supply tank 20. The fluid injection pressure need not be as high at the start of the operation as will be required later in the process since the hydraulic mining fluid jet will only have to travel a relatively short distance before contacting the face of the cavity in the tar sand deposit. If a noncondensible gas such as air, nitrogen, carbon dioxide, methane or natural gas is used, it is mixed with the aqueous hydraulic mining fluid and a two phase mixture is pumped down string 11 and out jets 5. The presence of a noncondensible gas is a highly desirable embodiment of the process of my invention for several reasons. The cavity in the tar sand deposit should be filled with gas rather than liquid especially after application of the process for a sufficient period to create a large cavity, to increase the distance that the jets travel away from the hydraulic mining apparatus. Also, maintaining a positive gas pressure in the cavity helps support the overburden and also assists in the pumping action in the bottom of the cavity.

As the bitumen and some sand are removed from the tar sand deposit, a cavity is created adjacent to the nozzles on injection string 4, and the size of this cavity increases with time. As the cavity size increases, it is necessary to increase the hydraulic mining fluid injection pressure so that fluid jet stream 10 will reach to the cavity walls with sufficient velocity to dislodge bitumen and sand.

Throughout the process of my invention, a mixture of bitumen and aqueous hydraulic mining fluid with sand suspended therein, flows back of the surface of the earth via the return flow path 17 in the example illustrated in the drawing. The produced bitumen hydraulic mining fluid mixtures passes via flow line 18 into separation tank 19. Sand settles to the bottom and may be removed mechanically. Bitumen separates into one phase and is removed by line 29 and then to surface processing equipment. Aqueous hydraulic mining fluid constitutes the other liquid phase, passing via line 21 back to tank 20 where it can be reheated and recycled into the injection string 11.

The temperature of the aqueous hydraulic fluid may be from 180° to 220° F. or above. In one preferred embodiment, the temperature of the bitumen-aqueous fluid pulp being produced is monitored, and the temperature is adjusted to yield a pulp temperature in the range of from 160° F. to 200° F. and preferably as near 180° F. as possible.

The bitumen-hot water mixture produced by my processes resembles the pulp of the hot water surface processes used in separating bitumen from tar sand material obtained by strip mining than it does any of the produced fluids obtained from known tar sand in situ separation techniques.

The effectiveness of the fluid for separating oil and sand increases with temperature. It is highly preferred that the fluid be in the liquid phase at the temperature and pressure in the extraction zone of the formation, since greater penetration is achieved with liquid jets than with vapor phase jets. The fluid temperature may be such that the fluid is at least partially in the vapor phase at atmospheric pressure, however. The preferred temperature is greater than 150° and preferably greater than 180° and below the boiling point of the fluid at the pressure in the cavity or treatment zone of the formation.

In a slightly different embodiment, a small but effective amount of a solvent for bitumen is included in the hydraulic mining fluid. Monocyclic aromatic solvents such as benzene, toluene or xylene, as well as saturated hydrocarbon solvents having from four to eight carbon atoms, naphtha or mixtures thereof may be injected with the hot aqueous fluid. The presence of a small amount of solvent increases the effectiveness of the process substantially. The preferred ratio of solvent to aqueous hydraulic mining fluid is from about 0.01 to about 0.50.

HYDRAULIC MINING FLUID

The hydraulic mining fluid injected in the form of a jet and preferably a rotating jet, is hot water or steam and an amine of the formula $$R_1R_2NH_3$$

wherein $R_1$ and $R_2$ are each hydrogen or a $C_1$ to $C_6$ and preferably a $C_2$ to $C_4$ alkyl, linear or branched, $R_3$ is a $C_3$ to $C_{20}$ and preferably $C_4$ to $C_{12}$ alkyl or $R_3$ is —$R_4NH_2$ wherein $R_4$ is 2 to 18 and preferably 3 to 11, and the sum of the number of carbon atoms in $R_1$, $R_2$ and $R_3$ is from 3 to 20 and preferably 7 to 13.

One example of a material which is within the scope of the above formula which has been tested and found to effectively dislodge viscous petroleum from sand grains is diethylaminopropylamine $(C_2H_5)_2NC_3H_6NH_2$. This material is a water white substance with a typical amine odor, having a boiling point of 159° C. and a freezing point of −100° C. The specific gravity is 0.82 (20/20° C.) and a flash point of 145° C. It is known for use as a curing agent for epoxy resins and as a chemical intermediate for other manufacturing and processes.

Another example of a preferred amine within the above formula is a $C_{10}$–$C_{13}$ sec alkyl primary amine. This compound is available commercially from Texaco Petrochemical Sales under the designation PT-9108 and has a boiling point of 259° C., and is only slightly soluble in water.

The amine described above is mixed with hot water or steam in a concentration of from 0.5 to 25 and preferably from 2 to 10 percent by weight.

NONCONDENSIBLE GAS

Noncondensible gas is, in a preferred embodiment, injected into the formation simultaneously with the hydraulic mining fluid. The use of a noncondensible gas in this process improves its operation considerably and in several ways. Maintenance of a positive pressure aids in supporting the overburden and helps the pumping action. By keeping the cavity formed in the formation by this process filled with gas rather than with liquid, the jets of fluid travel further away from the injection string. Also, some gas is dissolved and/or entrained in the pulp of bitumen and aqueous fluid, and this gas forms small bubbles during the surface separation to aid in separating bitumen and aqueous fluid.

Any readily available substance, at least a substantial portion of which remains gaseous at the temperature and pressure of the formation, and which is unreactive with the fluid injected and with petroleum may be used. Air is a suitable material when hot water is used, but steam and air should not be used together because of the likelihood of initiating an oxidation reaction. Nitrogen may be used safely with steam as well as with hot or cold water. Carbon dioxide may also be used with any of the hydraulic mining fluids described above. Hydrocarbons such as methane or ethane may also be used. Depending on the temperature and pressure of the tar sand formation, propane may sometimes be used. Mixtures of any two or more of the foregoing materials may also be used. The volume ratio of noncondensible gas to aqueous hydraulic mining fluid may be from about 1/10 to about 10. The noncondensible gas may be introduced simultaneously as a mixture using the same injection string, or simultaneously using separate injection strings, or slugs of aqueous hydraulic mining fluid may be alternated with slugs or non-condensible gas.

Field Example

A tar sand deposit is to be exploited and it is determined that the thickness of the tar sand deposit is 65 feet and the thickness of the overburden is 275 feet. Since the ratio of overburden thickness to tar sand deposit thickness is considerably greater than 1, strip mining is ruled out on economic basis. Moreover, the overburden thickness is not thick enough to make high pressure gas injection safe.

A well is drilled to the bottom of the deposit and a casing is set to the top portion of the tar sand deposit and cemented. A hydraulic mining apparatus similar to that shown in the drawing is used. The lower portion of the assembly is equipped with four horizontally oriented jet nozzles so that fluids pumped into the assembly will exit through these nozzles in a generally horizontal direction with considerable velocity. The surface equipment includes means for rotating the assembly by an electric motor, and sealing devices to establish a liquid tight seal between the rotating and nonrotating members are also provided. The hydraulic mining fluid chosen for this field trial is initially 200° F. water containing 5.0% by weight of dodecylamine. Methane is injected with the hot fluid to insure a gas-filled cavity and to provide support for the overburden. The volume ratio of methane to hydraulic mining fluid is about 2:10. Initially the injection pressure is approximately 100 pounds per square inch, since the jet of aqueous hydraulic mining fluid emerging from the nozzles must flow only a short distance before it impinges against the tar sand deposits. The mixture of bitumen from the tar sand and the hot aqueous hydraulic mining fluid is pumped by a jet pump in the bottom of the hydraulic mining assembly, and flows to the surface through a return flow path integral to the hydraulic mining assembly. The fluid produced at the surface contains "free" bitumen (not emulsified), hydraulic mining fluid, gas and sand separation is accomplished in two gravity settling tanks in series. Bitumen is sent to processing facilities and the aqueous fluid is recycled.

The pH and temperature of the fluid mixture (pulp) being produced is monitored continually. The temperature of the hydraulic mining fluid being injected is adjusted to maintain the pulp temperature at 180° F.

The hydraulic mining assembly is positioned so the jets are initially adjacent the top of the tar sand deposit. The assembly is rotated at 4 rpm and slowly lowered. The rate of lowering is initially about one foot per minute. As the bottom of the assembly reaches the bottom of the tar sand deposit, the direction is reversed and the assembly is raised at about one foot per minute while rotating and injecting hydraulic mining fluid.

As the cavity diameter increases, the aqueous hydraulic mining fluid jet streams from the nozzles must travel further away from the injection point before contacting the wall of the cavity in the tar sand deposit, and so the injection pressure must be increased. The need for an increase in injection pressure is determined by monitoring the ratio of bitumen and sand to aqueous fluid in the pulp being produced to the surface of the earth. A decrease in the concentration of bitumen and sand in the produced pulp indicates that the jets of aqueous hydraulic mining fluid are not moving sufficiently far away from the nozzles to contact virgin tar sand, and so the injection pressure must be increased. By increasing the injection pressure in small increments, e.g., 5 or 10 psi at a time, the injected aqueous hydraulic mining fluid stream may be made to continually contact the outer cavity walls within the tar sand deposit. The static gas pressure in the cavity is maintained constant since it is not desired to create a fracture between the pressurized tar sand formation and the surface of the earth which would establish an undesired return communication path through the overburden to the surface. While the static pressure in the cavity expressed in pounds per square inch must not exceed the overburden thickness expressed in feet, the injection pressure may go much higher, up to a thousand pounds or more. This process is continued until a substantial decrease in bitumen sand content of the produced bitumen sand water slurry is observed, and an increase in injection pressure up to 1500 psi fails to cause a corresponding increased in the bitumen sand content of the produced fluid pulp. This indicates that the maximum range of the hydraulic mining fluid jet within the cavity has been reached and no additional bitumen can be recovered by this technique from the cavity.

After it has been determined that the hydraulic mining process has been extended as far into the tar sand deposit as possible, the hydraulic mining fluid remaining within the cavity may be recovered by pumping to the surface for reuse in adjacent areas of the deposit.

EXPERIMENTAL SECTION

Laboratory tests were conducted utilizing samples of tar sand material. The samples were mixed at room temperature with diethylaminopropylamine as a solvent, and it was observed that under static conditions at ambient temperature, essentially all of the viscous tar sand materials were dislodged and removed from the mineral surfaces of the tar sand sample, thus indicating the effectiveness of this material for removing viscous petroleum from sand grains. Tar sand materials are bituminous in character and there is a great affinity between the hydrocarbon portion and the sand grains which is a major cause of the great difficulty that has been encountered in obtaining recovery of petroleum from tar sand deposits. Accordingly, the above-described observation is quite significant for application to bituminous, viscous petroleum formation as well as other viscous oil formations.

A series of displacement tests were conducted in small, seven-inch cells which were packed with 10.5° API crude oil, sand and water to give an initial oil saturation of about 0.55 and a permeability of about 0.35 darcies. The first cell was steam flooded at a 120 gram per hour steam rate at an injection pressure of 240 PSI while maintaining 200 PSI backpressure. The second cell was treated first with 10 percent pore volume amine additive prior to injecting the same quality steam at the same steam injection rate. The amine used in this test was a $C_{10}$–$C_{13}$ (secondary alkyl) primary amine available commercially from Texaco Petrochemicals Department under the designation PT-9108. All of the amine was injected in a single 10 percent pore volume slug prior to injecting steam into the core, to permit mixing of amine and steam in the core. The first steam flood succeeded in reducing the oil saturation to 0.195 which is equivalent to 63.6 percent recovery. In the second flood, employing the steam-amine mixture, the oil saturation was reduced from the same 0.55 initial level to 0.051, for 90.7 percent recovery, which is 40 percent greater than the base steam run. This is considered to be an excellent recovery for such viscous crude, and readily illustrates the effectiveness of steam-amine mixture for separating viscous oil from mineral surfaces.

While my invention has been described in terms of a number of specific illustrated embodiments, it is not so limited, and many modifications thereof will be apparent to those persons skilled in the related art without departing from the true spirit and scope of my invention. Furthermore, it is not my intention to be bound by any particular explanation of the mechanisms responsible for the benefits resulting from application of the process of my invention. It is my intention that my invention be limited only by such restrictions and limitations as may be imposed by the appended claims.

I claim:

1. A hydraulic mining method for recovering viscous petroleum including bitumen from subterranean, viscous petroleum-containing unconsolidated mineral formations including tar sand deposits, said formations being penetrated by at least one well, comprising:

(a) introducing a hot, aqueous hydraulic mining fluid comprising a mixture of hot water or steam and a diamine having the following formula:

$$R_1R_2NR_3NH_2$$

wherein $R_1$ and $R_2$ and each hydrogen or a $C_1$ to $C_6$ alkyl, linear or branched, N in nitrogen, H is hydrogen, and $R_3$ is a $C_2$ to $C_{18}$ alkylene, linear or branched, the number of carbon atoms in $R_1$, $R_2$ and $R_3$ being from 3 to 20, into the formation via the well in the form of a high velocity jet which rotates within the formation, said jet contacting the formation with sufficient energy to dislodge viscous petroleum one unconsolidated minerals; and (b) recovering a fluid pulp comprising viscous petroleum, unconsolidated minerals and hydraulic mining fluid from the formation.

2. A method as recited in claim 1 wherein the diamine is diethylaminopropylamine.

3. A method as recited in claim 1 wherein a noncondensible gas is introduced into the formation simultaneously with the hydraulic mining fluid.

4. A method as recited in claim 3 wherein the noncondensible gas is nitrogen.

5. A method as recited in claim 3 wherein the noncondensible gas is methane.

6. A method as recited in claim 3 wherein the noncondensible gas is carbon dioxide.

7. A method as recited in claim 3 wherein the noncondensible gas is natural gas.

8. A method as recited in claim 1 wherein the high velocity jet of aqueous hydraulic mining fluid is also moved in a vertical direction within the formation.

9. A method as recited in claim 1 wherein the aqueous hydraulic mining fluid is heated to a temperature of greater than 150° F. prior to being introduced into the formation.

10. A method as recited in claim 1 wherein the temperature of the hydraulic mining fluid being introduced is adjusted to yield a produced pulp temperature of from about 160° F. to about 200° F.

11. A method as recited in claim 1 wherein the noncondensible gas is selected from the group consisting of nitrogen, carbon dioxide, methane, ethane, propane, natural gas, and mixtures thereof.

12. A method as recited in claim 1 wherein the volume ratio of noncondensible gas to hydraulic mining fluid is from about 0.10 to about 10.0.

13. A method as recited in claim 1 wherein $R_1$ is a $C_2$ to $C_4$ alkyl.

14. A method as recited in claim 1 wherein $R_2$ is a $C_2$ to $C_4$ alkyl.

15. A method as recited in claim 1 wherein $R_3$ is a $C_3$ to $C_{11}$ alkylene.

* * * * *